E. M. MUELLER.
SHUTTER ATTACHMENT FOR MOVING PICTURE CAMERAS.
APPLICATION FILED SEPT. 13, 1920.
1,420,053.
Patented June 20, 1922.
2 SHEETS—SHEET 1.
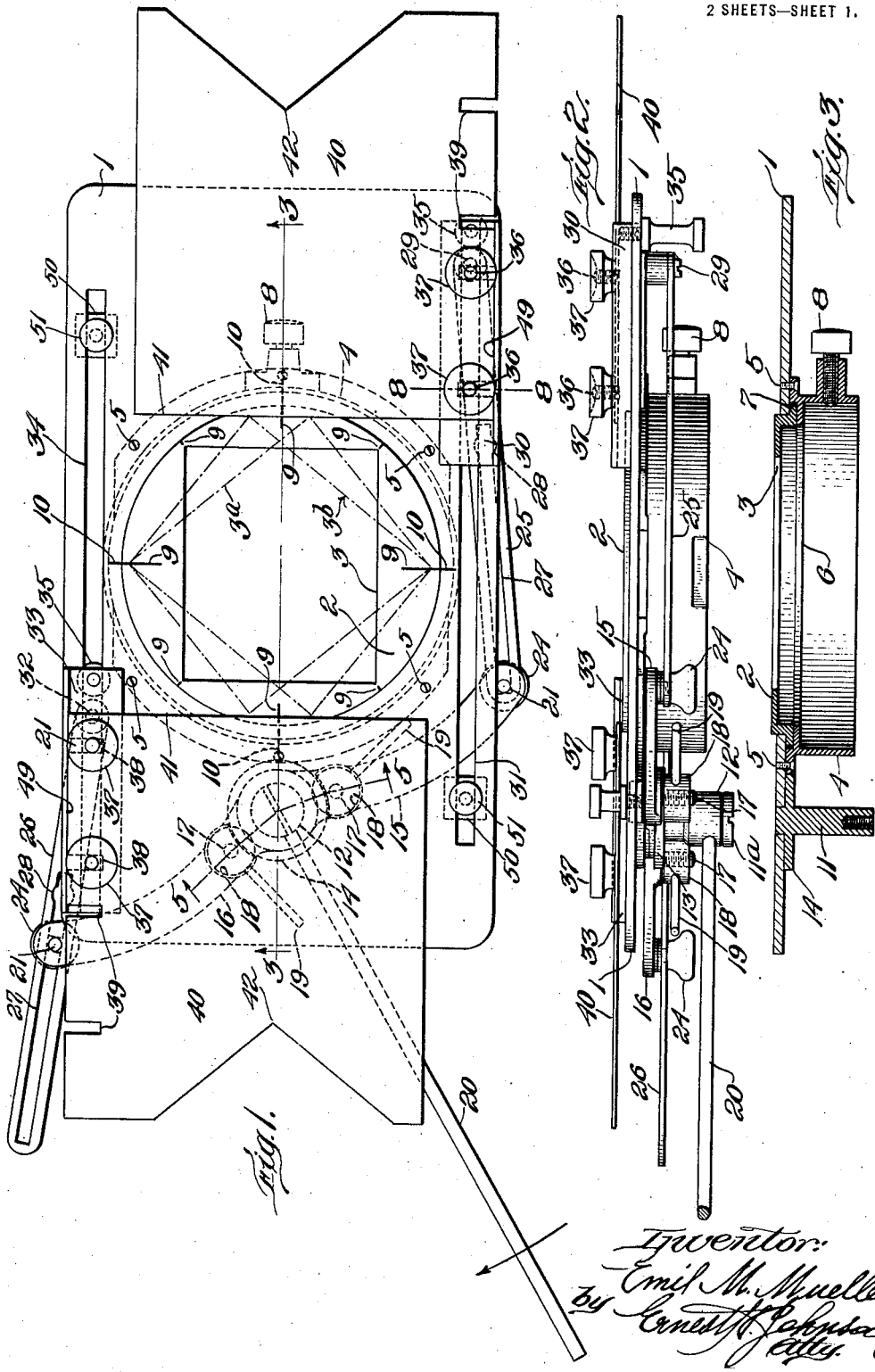

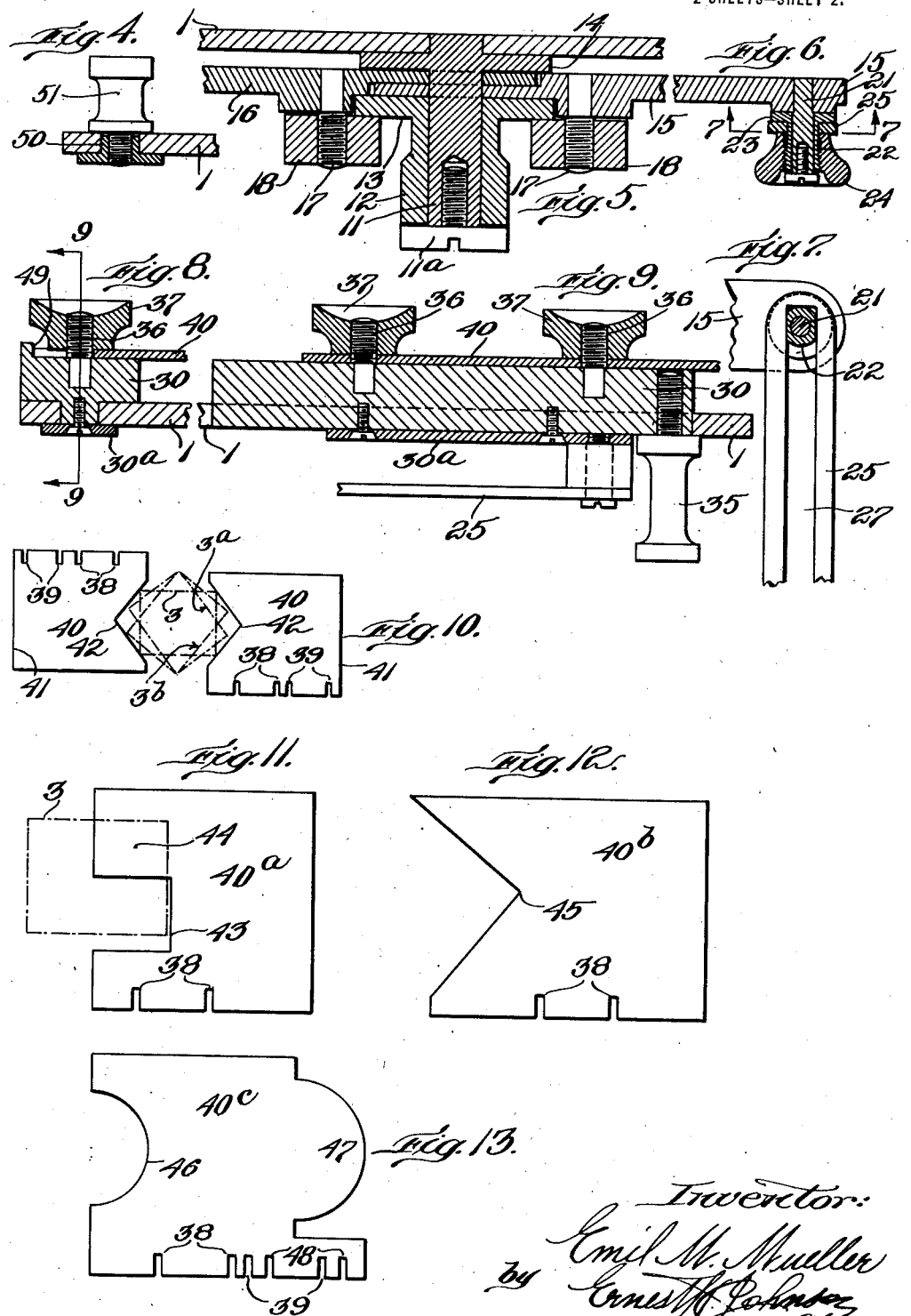

UNITED STATES PATENT OFFICE.

EMIL M. MUELLER, OF NEW YORK, N. Y., ASSIGNOR TO C. P. GOERZ AMERICAN OPTICAL COMPANY, OF NEW YORK, N. Y., A CORPORATION OF NEW YORK.

SHUTTER ATTACHMENT FOR MOVING-PICTURE CAMERAS.

1,420,053.　　　　　Specification of Letters Patent.　　Patented June 20, 1922.

Application filed September 13, 1920. Serial No. 409,803.

*To all whom it may concern:*

Be it known that I, EMIL M. MUELLER, of the city of New York, in the county of New York and State of New York, have invented certain new and useful Improvements in Shutter Attachments for Moving-Picture Cameras, of which the following is a specification.

My invention relates to camera attachments and particularly to shutter attachments for moving picture cameras, and it has for its object to provide an improved device of this character.

To this end my invention consists of a shutter attachment for cameras having the peculiar features of construction and mode of operation set forth in the following description and particularly pointed out and defined in the claims at the close thereof.

In the accompanying drawings:

Figure 1 is a front view of a shutter attachment for cameras constructed in accordance with my invention.

Figure 2 is a bottom plan view of the attachment shown in Figure 1.

Figure 3 is a section on the line 3—3 of Figure 1, but with parts omitted.

Figure 4 is a sectional detail, upon enlarged scale, of one of the adjustable stops hereinafter referred to.

Figure 5 is an enlarged sectional view on line 5—5 of Figure 1.

Figure 6 is an enlarged sectional view of one of the pivotal connections hereinafter referred to.

Figure 7 is a section on line 7—7 of Figure 6.

Figure 8 is an enlarged sectional view on line 8—8 of Figure 1.

Figure 9 is a section on line 9—9 of Figure 8.

Figure 10 shows, detached, the two shutters of the attachment illustrated in Figure 1 but with said shutters used in another fashion.

Figures 11, 12 and 13 illustrate other forms of shutters for use upon the attachment shown in Figure 1.

My improved shutter attachment for cameras, as herein shown, comprises a more or less rectangular base plate 1 made at its middle with a circular aperture within which is rotatably mounted a member 2 formed with a rectangular aperture 3 therethrough which, by rotative adjustment of member 2 relatively to base-plate 1, may be angularly positioned so as to occupy different positions with reference to the film aperture of the camera as required by the pictures being taken or displayed.

Upon the rear side of plate 1 and surrounding the central aperture thereof is a ring, or short tube 4, fastened to said plate by means of screws 5. Upon its interior the tube 4 is made with a flange 6 between which and plate 1 is rotatably confined an outwardly extending flange 7 provided upon the aperture member 2 so that the plate and said member are fastened together with provision for rotative adjustment of the latter. The ring or tube 4 is provided with a set screw 8 by means of which the attachment is secured to the camera, the ring or tube receiving within it the outer end of the lens mounting or other part of the camera, to which it is secured by the set screw 8 with the aperture 3 in alinement with the film opening and lens. Index markings 9 upon the outer face of member 2 adapted to be registered with index markings 10 upon the outer face of plate 1 are provided for use in positioning the member 2.

The base plate 1 has permanently secured to it a fulcrum post 11 projecting from its rear side upon which post is loosely mounted a hub 12, Figures 1, 2 and 5, made with an annular flange 13, and between the inner flanged end of this hub 12 and the base portion 14 of post 11, the latter has pivotally mounted upon it the inner ends of two lever arms 15 and 16. Adjacent the hub 12 each of these lever arms is provided with a threaded stud 17 on which is mounted a nut 18 provided with a radially disposed handle 19 by means of which it may be conveniently operated to clamp its arm 15, or 16, rigidly to the flange 13, or to free said arm therefrom. The hub 12 which is held in position upon stud 11 by the head of a screw 11ª, is provided with a comparatively long radially disposed arm 20 by means of which it is manually turned or rocked on the post 11.

At its outer end each lever arm 15 and 16 has rigidly and permanently fastened thereto a stud 21 upon which is loosely mounted a sleeve 22 provided at its inner end with a flange 23 and having its outer end portion exteriorly threaded to receive upon it a thumb nut 24. The sleeves 22 of the lever arms 15 and 16 extend through slotted links 25 and 26 respectively, each of said links being disposed between the flange 23 of its sleeve and the nut 24 of the latter so that by tightening up said nut the sleeve may be rigidly clamped to the link at any desired point along the slot 27 thereof. In other words the construction just described provides an adjustable pivotal connection between each lever arm and its link. In order to prevent rotation of each sleeve 22 on its stud 21 when the nut 24 is being turned, that portion of the sleeve 22 which occupies position within the slot 27 of its link is made non-circular in cross-section as shown in Figure 7, said non-circular portion being made with two parallel, oppositely disposed, flat sides fitting against the side walls of the slot 27.

The link 25 has one end thereof pivotally connected at 29 to a shutter carrier 30 made upon its under side with a tongue occupying a slot 31 provided in base-plate 1 near one side thereof, while the link 26 has one end thereof pivotally connected at 32 to another shutter carrier 33 made upon its under side with a tongue occupying a slot 34 provided near the opposite side of plate 1. Plates 30ᵃ fastened by screws to the tongues of carriers 30 and 33 hold the latter against withdrawal from the slots 31 and 34. The two slots 31 and 34 are parallel and disposed at opposite sides of the aperture member 2.

It will be clear from the above description that when both nuts 18 are set up tight so as to clamp both lever arms 15 and 16 to the hub 12, the two shutter carriers 30 and 33 will be moved simultaneously in opposite direction along their slots when said hub 12 is turned on post 11 by means of the handle 20. It will also be clear that if only one of the nuts 18 is set up tight and the other nut is left loose, then only the shutter carrier connected with the arm that is clamped to the hub 12 will be operated. In order to provide for securing either or both shutter carriers against movement relatively to base plate 1 when thus disconnected from hub 12 I provide each carrier with a thumb screw 35 extending through the slot within which the carrier is mounted. By tightening up either screw 35 its shutter carrier may be clamped immovably to the base plate 1.

Each shutter carrier is provided with a pair of threaded studs 36 upon each of which is mounted a thumb nut 37 by means of which a shutter may be fastened in position upon the front side of the carrier.

The front side of the carrier 33 is, as shown in Figure 2, just outside, or slightly off-set from, the plane of the outer face of aperture member 2 so that the shutter 40 on carrier 33 can pass back and forth in front of said member, while front side of the carrier 30 is off-set to a greater degree from the plane of the outer face of member 2 so that the shutter 40 secured in position upon said carrier can pass the shutter 40 on carrier 33 without interference between the two. In other words the two carriers 30 and 33 support the two shutters 40 in offset, or different, planes so that both shutters can be brought into overlapping positions in front of aperture member 2.

The two shutters 40 shown in Figures 1 and 2 are alike in form and both are made from sheet metal or other suitable opaque or transparent material. Two pairs of notches 38 and 39 provided along one side of each shutter 40 permit that side of the shutter to be slid into position upon its carrier under the nuts 37 thereof with its outer edge bearing against a positioning shoulder 49 that is provided on each carrier. When thus slid into position on its carrier the notches 38, or 39, receive or accommodate the studs 36 which together with shoulder 49 serve to position the shutter on the carrier, and when the nuts 37 are screwed down tight the shutter is secured rigidly in position upon its carrier without liability of displacement. Each shutter 40 shown in Figure 1 is made at one end with a straight edge 41 and at its opposite end with an edge formed with a V-shaped notch 42. By providing each shutter 40 with two pairs of notches 38 and 39 the shutters may be applied to the carriers so that their straight edges 41 co-operate with apertures 3 as shown in Figure 1, or their positions may be reversed as shown in Figure 10 so that their V-notched edges co-operate with said aperture. The shutters should be placed upon their carriers as shown in Figure 1 when the attachment is used for double or more exposure work for diagonal doubles and for curtain and sliding door effect. The arrangement of the shutters 40 shown in Figure 10 is resorted to when vignetting the picture in rhomboid shape.

A feature of my invention is that the attachment may include a set of interchangeable shutters of various shapes, some or all of which are reversible and made with opposite end edges of different shapes or outlines adapted to serve different purposes such as dissolving, vignetting, double exposure and for producing curtain effects. The set of shutters herein provided includes, in addition to the pair of shutters 40, a single shutter 40ᵃ, of Figure 11; a pair of shutters of the shape shown in Figure 12, and a pair of shutters shaped as shown in Figure 13 but of opposite or counterpart shape. The shutter 40ᵃ of Figure 11 is formed at one end with a rectangular off-set notch 43 so that the shutter may be employed to blanket a rectangular corner portion of the aperture 3 as shown at 44 in Figure 11, or, when used with another shutter having a straight edge, to blanket all but a rectangular corner portion of the opening 3. The two sides of the V-shaped notch 45 provided at one end of the shutter 40ᵇ shown in Figure 12 are at right angles and a pair of shutters of this shape may be used in dissolving and vignetting, when it is desired to maintain the rectangular shape, and for opening scenes. A pair of slides 40ᶜ shaped as shown in Figure 13 are useful in double exposure work where edges are double exposed and for making the double exposure appear to slide in and out of the picture. The shape 47 of shutter 40ᶜ and its opposite or counterpart can be employed also for half circle vignetting as well as playing in and out. The shape 46 of shutter 40ᶜ and its opposite are used on the small side of the rectangular aperture 3.

By means of the index markings 9 and 10 upon member 2 and base-plate 10, respectively, the opening 3 of member 2 may be accurately and quickly placed in either one of the positions indicated by dot-and-dash line 3ᵃ and 3ᵇ in Figure 10, and when placed in either one of these two positions and two shutters 40 are used as in Figure 10, two opposite sides of the opening 3 will be parallel with two parallel sides of the notches 42 while the other two sides of the opening 3 will be nearly parallel with the other two parallel sides of the notches. When two shutters 40ᵇ (Figure 12) are used after the fashion illustrated in Figure 10 and the opening 3 is positioned as indicated by the dot-and-dash lines 3ᵇ, the sides of both notches 45 will each be exactly parallel with one of the sides of the opening 3 and remain so during the opening and closing movements of the shutters.

Within each slot 31 and 34 is mounted a block 50, Figures 1, 2 and 4, made with a tapped hole having mounted therein a thumb screw 51 by means of which the block may be clamped at any desired point along its slot. These blocks are provided to serve as stops to limit the inward strokes or movements of the shutters, particularly when making double exposures.

It will of course be understood that the invention is not confined to the example of shutters illustrated and that it may comprise any modifications in this respect which do not affect its principles. Also the camera attachment may be operated and controlled otherwise than as herein shown.

What I claim is:

1. A camera attachment of the character described comprising a base-plate attachable to the camera; a pair of shutter carriers slidably connected with said base-plate and each provided with means for securing a shutter thereto.

2. A camera attachment of the character described comprising a base-plate attachable to a camera; a pair of shutter carriers slidably mounted upon said base-plate and each provided with means for clamping a shutter thereto.

3. A camera attachment of the character described comprising a base-plate attachable to a camera; a pair of shutter carriers slidably mounted upon said base-plate; a pair of reversible shutters each having the opposite ends thereof differently shaped, and means for securing each of said shutters to one of said carriers with provision for removal.

4. A camera attachment of the character described comprising a base-plate attachable to a camera; a pair of shutter carriers slidably mounted upon said base-plate each provided with means for securing a shutter thereto, and adjustable stops for limiting the movements of said carriers.

5. A camera attachment of the character described comprising a base-plate attachable to a camera; a pair of shutter carriers slidably mounted upon said base-plate, each provided with means for securing a shutter thereto, and stops adjustably mounted upon said base-plate for limiting the movements of said carriers.

6. A camera attachment of the character described comprising a base-plate attachable to a camera; a pair of shutter carriers slidably mounted upon said base-plate; a pair of shutters each mounted upon one of said carriers, and stops adjustably mounted upon said base-plate for limiting the movements of said carriers.

7. The combination with a base-plate attachable to a camera and formed with a circular opening therethrough, of a circular member rotatably mounted within said opening and made with an aperture therethrough that is positioned to aline with the film aperture of the camera.

8. The combination with a base-plate attachable to a camera and formed with an opening therethrough, of a rotatably adjustable member mounted upon said base-plate opposite said opening and made with an aperture therethrough that is positioned to aline with the film aperture of the camera.

9. The combination with a base-plate attachable to a camera and formed with an opening therethrough, of a rotatably adjustable member mounted upon said base-plate opposite said opening and made with a rectangular opening therethrough that is positioned to aline with the film aperture of the camera.

10. A camera attachment of the character described comprising a base-plate attachable to a camera and formed with an opening therethrough; a rotatably adjustable member mounted upon said base-plate opposite said opening and made with an aperture therethrough that is positioned to aline with the film aperture of the camera and a pair of shutter carriers slidably mounted upon said base-plate.

11. A camera attachment of the character described comprising a base-plate attachable to a camera and formed with an opening therethrough; a rotatably adjustable member mounted upon said base-plate opposite said opening and made with an aperture therethrough that is positioned to aline with the film aperture of the camera; a pair of shutter carriers slidably mounted upon said base-plate; a pair of reversible shutters each having its opposite ends differently shaped, and means for removably fastening each shutter to one of said carriers.

12. A camera attachment of the character described comprising a base-plate attachable to a camera and formed with an opening therethrough; a rotatably adjustable member mounted upon said base-plate opposite said opening and made with an aperture therethrough that is positioned to aline with the film aperture of the camera; a pair of shutter carriers slidably mounted upon said base-plate; a pair of reversible shutters each formed at one end with a straight edge and at its opposite end with a notched edge, and means for fastening each shutter to one of said carriers with provision for removal.

13. A camera attachment of the character discribed comprising a base-plate attachable to a camera; a pair of shutter carriers slidably mounted upon said base-plate; a pair of reversible shutters each having its opposite ends differently shaped, and means for fastening each shutter to one of said carriers with provision for reversal thereof.

14. A camera attachment of the character described comprising a base-plate attachable to a camera; a pair of shutter carriers slidably mounted upon said base-plate; a set of differently shaped and interchangeable shutters, and means on each carrier for fastening one of said shutters thereto with provision for removal.

15. A camera attachment of the character described comprising a base-plate attachable to a camera; a pair of shutter carriers slidably mounted upon said base-plate; a pair of lever arms pivotally mounted upon said base-plate and each connected with one of said carriers; a single member for actuating said lever arms, said member being movably mounted upon said base-plate, and means for connecting one or both of said lever arms to said actuating member.

16. A camera attachment of the character described comprising a base-plate attachable to a camera; a pair of shutter carriers slidably mounted upon said base-plate; a pair of lever arms pivotally mounted upon said base-plate each connected with one of said carriers; a single member for actuating said lever arms, said member being pivotally mounted upon said base-plate, and means for connecting one or both of said lever arms to said actuating member.

17. A camera attachment of the character described comprising a base-plate attachable to a camera; a pair of shutter carriers slidably mounted upon said base-plate; a stud projecting from said base-plate; a pair of lever arms pivotally mounted upon said stud; an actuating member for said lever arms also pivotally mounted upon said stud, and means for connecting one or both of said lever arms to said actuating member.

18. A camera attachment of the character described comprising a base-plate attachable to a camera; a pair of shutter carriers slidably mounted upon said base-plate; a stud projecting from said plate; a pair of lever arms pivotally mounted upon said stud; an actuating member for said lever arms also pivotally mounted upon said stud, and means for clamping one or both of said lever arms to said actuating member.

19. A camera attachment of the character described comprising a base-plate attachable to a camera; a pair of shutter carriers slidably mounted upon said base-plate; a stud projecting from said base-plate; a pair of lever arms pivotally mounted upon said stud; a pair of links each pivotally connected at one end with one of said carriers and at its opposite end with one of said lever arms, one of said pivotal connections of each link being adjustable lengthwise of said link; an actuating member for said lever arms also pivotally mounted upon said stud, and means for fastening one or both of said lever arms to said actuating member.

20. A camera attachment of the character described comprising a base-plate attachable to a camera made with an opening therethrough adapted to register with the film aperture of the camera and with a pair of slots, one at each side of said opening; a pair of shutter carriers, each slidably mounted within one of said slots; means on each carrier for clamping a shutter thereto; an actuating member movably mounted upon said base-plate; means for connecting one or both of said carriers with said actuating member, and stops adjustably mounted within said slots for limiting the movements of said carriers.

21. A camera attachment of the character described comprising a base-plate attachable to a camera and made with an opening therethrough adapted to register with the film aperture of the camera and with a pair of shutter carriers, each slidably mounted within one of said slots; means on each carrier for clamping a shutter thereto; an actuating member movably mounted upon said base-plate; means for connecting one or both of said carriers with said actuating member, and means on each carrier for clamping the latter to the base-plate when disconnected from said actuating member.

22. A camera attachment of the character described comprising a base-plate attachable to a camera and made with an opening therethrough adapted to register with the film aperture of the camera and with a pair of slots, one at each side of said opening; a pair of shutter carriers, each slidably mounted within one of said slots; and means on each carrier for clamping a shutter thereto.

In testimony whereof I have affixed my signature, in presence of two witnesses.

EMIL M. MUELLER.

Witnesses:
ALFRED G. BOHM,
HENRY J. HENGSBACH.